United States Patent
Ohara

(10) Patent No.: US 7,222,895 B2
(45) Date of Patent: May 29, 2007

(54) DEVICE FOR STORING ARTICLE PROTECTING AUTOMOBILE BODY

(76) Inventor: Toshiyuki Ohara, 22-33, Shin-ashiyashimo, Suite-shi, Osaka 565-0803 (JP)

( * ) Notice: Subject to any disclaimer, the term of this patent is extended or adjusted under 35 U.S.C. 154(b) by 0 days.

(21) Appl. No.: 10/540,935

(22) PCT Filed: Dec. 25, 2003

(86) PCT No.: PCT/JP03/16829

§ 371 (c)(1),
(2), (4) Date: Jun. 29, 2005

(87) PCT Pub. No.: WO2004/060725

PCT Pub. Date: Jul. 22, 2004

(65) Prior Publication Data

US 2006/0071487 A1    Apr. 6, 2006

(30) Foreign Application Priority Data

Dec. 31, 2002  (JP)  ............................. 2002-383830

(51) Int. Cl.
    *B60R 19/38* (2006.01)
(52) U.S. Cl. ........................ 293/118; 293/126
(58) Field of Classification Search ................ 293/116, 293/118, 119, 126, 128, 21; 280/770
See application file for complete search history.

(56) References Cited

U.S. PATENT DOCUMENTS

| | | | |
|---|---|---|---|
| 3,480,296 A | * | 11/1969 | Starling ...................... 293/116 |
| 3,718,357 A | | 2/1973 | Hertzell |
| 4,461,503 A | * | 7/1984 | Melby ......................... 293/118 |
| 4,666,196 A | * | 5/1987 | McCoy et al. .............. 293/128 |
| 4,815,777 A | * | 3/1989 | Campbell .................... 293/107 |
| 5,004,281 A | * | 4/1991 | Yamazaki .................... 293/118 |
| 2002/0105197 A1 | * | 8/2002 | Unterwagner ............... 293/128 |

FOREIGN PATENT DOCUMENTS

| | | |
|---|---|---|
| JP | 62-20915 | 2/1987 |
| JP | 63-159351 | 10/1988 |
| JP | 11-291827 | 10/1999 |
| JP | 2000-85360 | 3/2000 |

* cited by examiner

*Primary Examiner*—Jason Morrow
(74) *Attorney, Agent, or Firm*—Westerman, Hattori, Daniels & Adrian, LLP.

(57) ABSTRACT

An article that is mounted for protecting an automobile body is stored within the automobile body by electric power when the automobile body does not need to be protected. A device stores within the automobile body by electric power an article (2) having an article (1) for protecting the automobile body mounted thereto and being of the same material as the automobile body. The device installs by electric power the article for protecting the automobile body into a state in which it protects the automobile body, primarily, when the automobile is parked. The device stores by electric power the article for protecting the automobile body when the automobile is running.

8 Claims, 8 Drawing Sheets

| FIG. 3 SHOWS A STATE BEFORE STORAGE |
|---|
| ↓ |
| FIG. 4 SHOWS A STATE DURING ROTATION |
| ↓ |
| FIG. 5 SHOWS A STATE DURING ROTATION |
| ↓ |
| FIG. 6 SHOWS A STATE DURING ROTATION |
| ↓ |
| FIGS. 7, 8, AND 9 SHOW A STORED STATE |

DEVICE FOR STORING ARTICLE PROTECTING AUTOMOBILE BODY

TITLE OF THE INVENTION

1. Field of the Invention

The present invention relates to a device for storing within an automobile body by electric power an article mounted for protecting the automobile body when it is not necessary to protect the automobile body.

2. Background of the Invention

Hitherto, in order to protect an automobile body, rubber or metal is directly mounted and secured to the automobile body.

However, this method has the following problems:

(A) Since an article which protects an automobile body is secured in a protruding manner to the automobile body, it is not possible to choose between using the article when it is required and not using the article when it is not required.

(B) Since there are constraints to the design for mounting an article which protects the automobile body in relation to the design of the automobile, rubber or metal cannot be mounted to a portion requiring protection.

(C) Therefore, when a person gets in or out of an automobile in a parking lot of, for example, a supermarket, a collision accident occurs with a door of another automobile.

The present invention is achieved to overcome these problems.

BRIEF SUMMARY OF THE INVENTION

The present invention provides a device for storing within an automobile body by electric power an article having an article for protecting the automobile body mounted thereto and being of the same quality as the automobile body.

A description of an embodiment of the present invention will hereunder be given.

(A) The embodiment provides a structure in which, as shown in FIG. 17, in order to protect an automobile body, an article mounted to and having the same material as the automobile body is rotated and stored, and the automobile body and the article having the same material as the automobile body are integrated.

(B) The embodiment provides a structure in which the article having the same material as the automobile body is rotated and stored by electric power.

When the present invention is carried out using the above-described structures and it is necessary to protect the automobile body when, for example, the automobile is parked, a single-purpose motor is operated with a remote controller or a panel switch in the automobile in order to rotate the article having the same material as the automobile body and secure it in a state in which the automobile body is protected.

When the automobile body does not need to be protected, the article mounted for protecting the automobile body is stored within the automobile body.

As shown in FIG. 16, articles are mounted to portions of the automobile body that require protection. The portions are the sides, the left and right front portions, and the left and right rear portions of the automobile.

Optionally, the articles mounted for protecting the automobile body are moved horizontally and are stored by electric power.

Hitherto, since the articles for protecting the automobile body are secured in a protruding manner to the automobile body, a driver cannot choose between using the articles when they are required and not using the articles when they are not required. However, the present invention makes it possible to install by electric power the articles mounted for protecting the automobile body when the driver needs to protect the automobile body.

When the automobile body does not need to be protected, the articles can be stored. Hitherto, since there are constraints on the design for mounting an article, which protects the automobile body, in relation to the design of the automobile, the article cannot be mounted to a portion of the automobile body requiring protection. In contrast, the present invention makes it possible to mount an article to any portion of the automobile body requiring protection.

In addition, the related constraints on the design no longer exist, in particular, the design of the front and rear bumpers no longer needs to be such that the bumpers be linearly disposed with articles installed on the sides for protecting the automobile body. Therefore, the design is considerably improved.

DETAILED DESCRIPTION OF THE INVENTION

Figure 1:
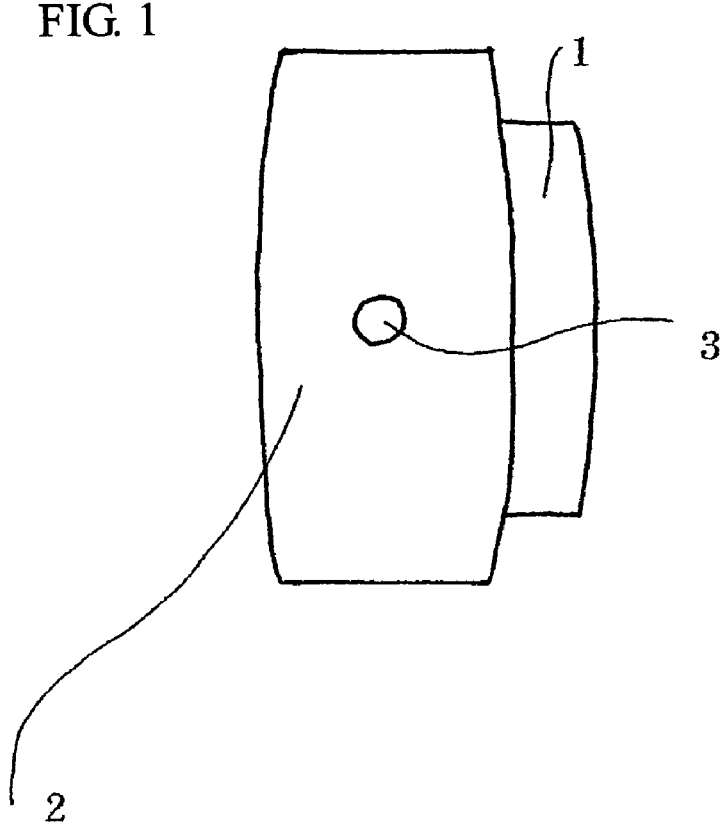
FIG. 1 is a partial enlarged side view of the present invention.

The present invention will be described in more detail with reference to the attached drawings. FIG. 1 is a partial enlarged side view of the present invention in which a rotary shaft 3 and an article 1 for protecting an automobile body (referred to also as a "first article") are mounted to an article 2 (referred to also as a "second article") having the same material as the automobile body. The article 2 having the same material as the automobile body is made the same as the automobile body or made similarly with a lightweight material while the article 1 for protecting the automobile body is protecting the automobile body or is stored in the automobile body.

The rotary shaft 3, having an axis of rotation, is connected to a device for installing by electric power the article 1 for protecting the automobile body into a state in which the article 1 protects the automobile body and into a state in which the article 1 is stored in the automobile body. As is apparent from the drawings, the first article 1 and the second article 2 are attached to form a rotatable body, which rotates about the axis of rotation of rotary shaft 3. The rotatable body has a first position and a second position such that, in the first position, the first article 1 extends from the automobile body to protect the automobile body, and, in the second position, the first article 1 is concealed within the automobile body. The rotating body must rotate 180 degrees to change its position from the first position to the second position. In the embodiment shown in FIG. 1, with respect to a cross-section taken perpendicular to the axis of rotation, the axis of rotation extends along the center of the second article 2. A switch is operative to activate electric power to rotate the rotating body between the first position and the second position, The article 1 for protecting the automobile body may be formed of rubber, metal, plastic, or any other various materials for protecting the automobile body, or may be formed of a combination of these materials.

Figure 2:
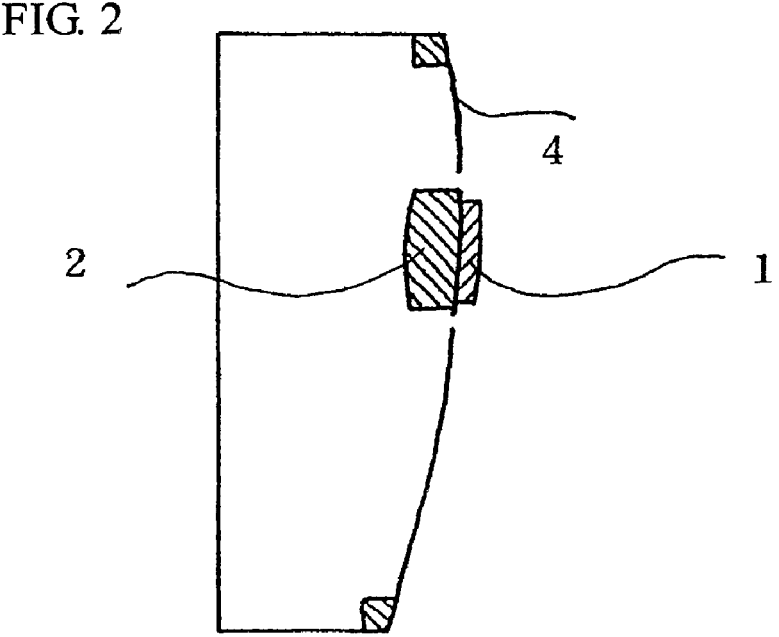
FIG. 2 is a sectional view of the present invention.
Figure 3:
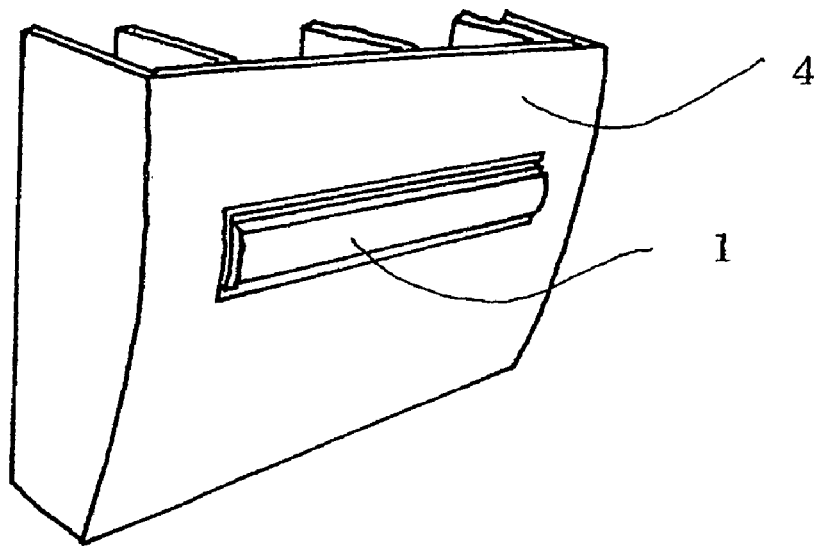
FIGS. 3, 4, 5, 6, and 7 are perspective views of the present invention.
Figure 4:
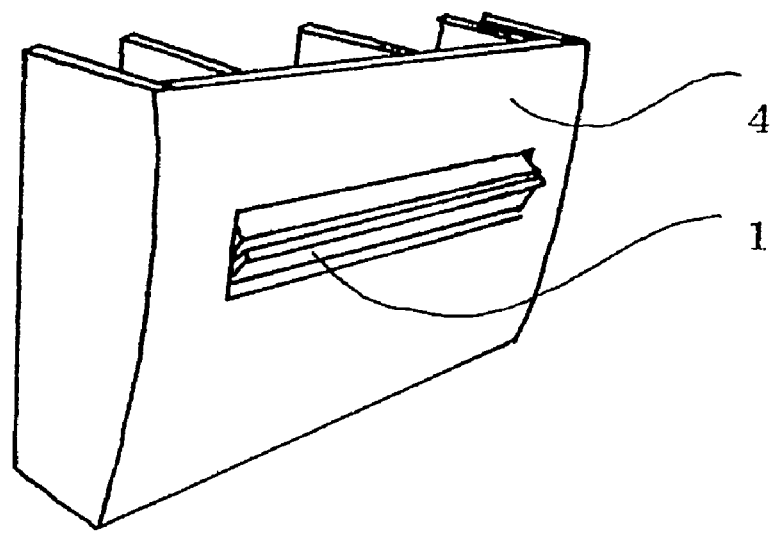
Figure 5:
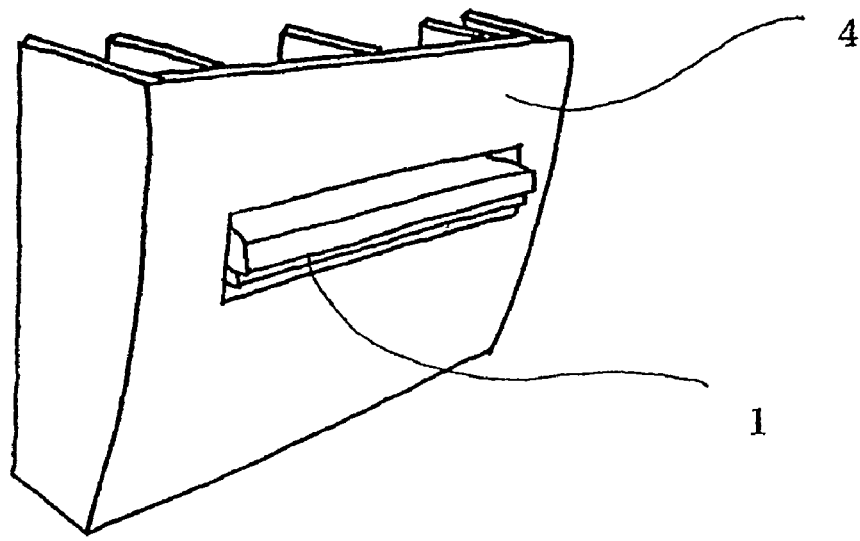
Figure 6:
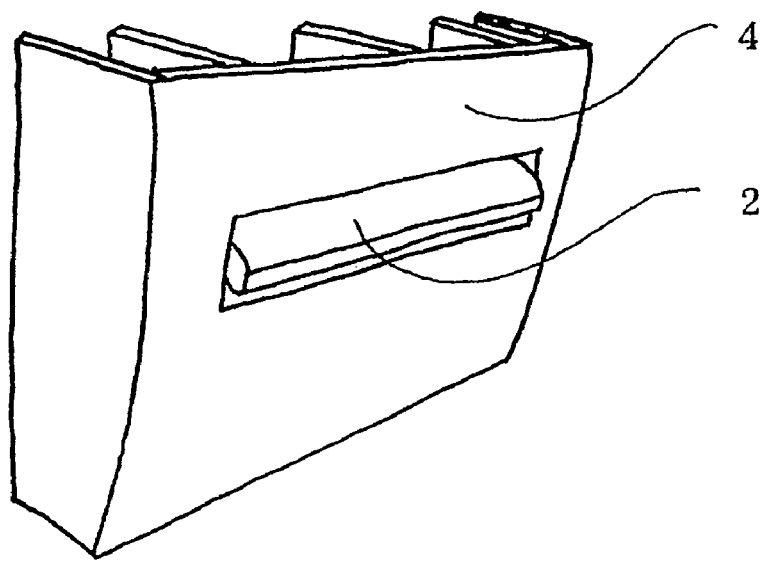
Figure 7:
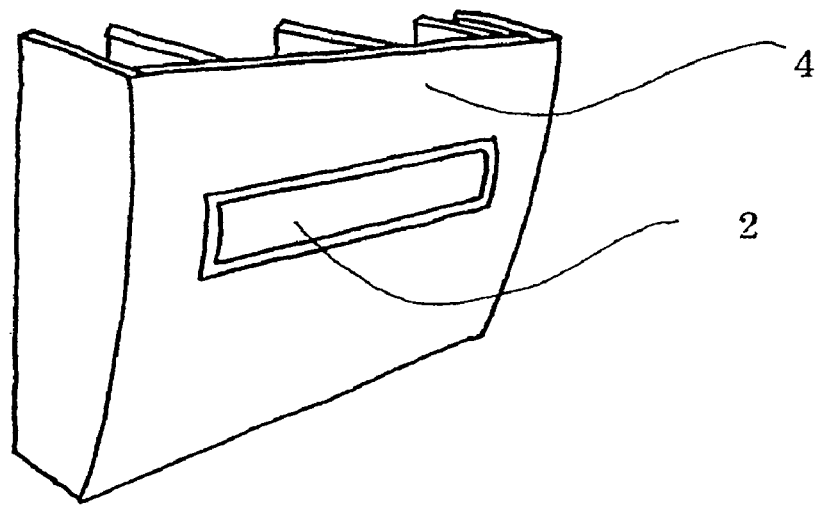
Figure 8:
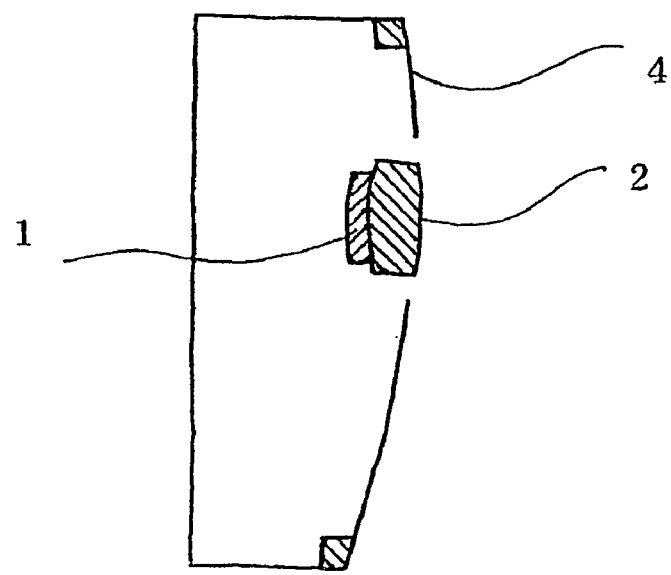
FIG. 8 is a sectional view of the present invention.
Figure 9:
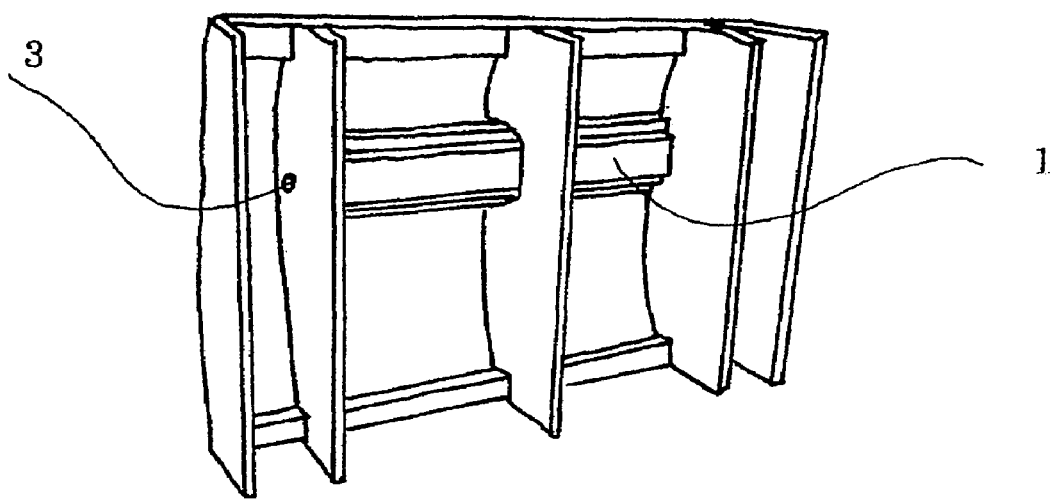
FIG. 9 is a perspective view of the present invention.

FIG. 2 is a sectional view of the present invention in which what is shown in FIG. 1 is mounted to an automobile body 4. FIG. 3 shows a state in which the article 1 for protecting the automobile body is installed into the state in which it protects the automobile body, and FIGS. 4, 5, and 6 show a state in which it is rotated and being stored. FIGS. 7, 8, and 9 show the state in which the article 1 for protecting the automobile body is stored within the automobile body.

Figure 10:
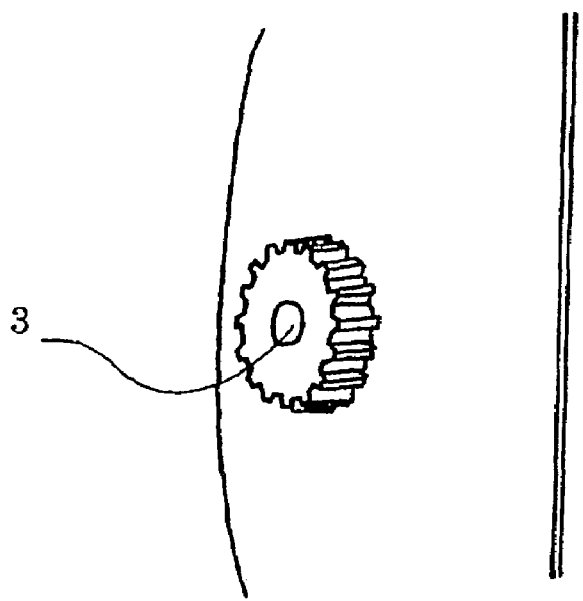
FIG. 10 is a partial enlarged perspective view of the present invention.
Figure 11:
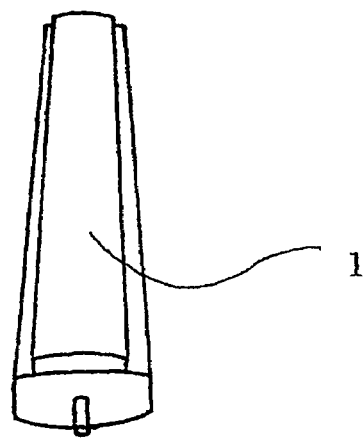
FIG. 11 is a partial perspective view of the present invention.
Figure 12:
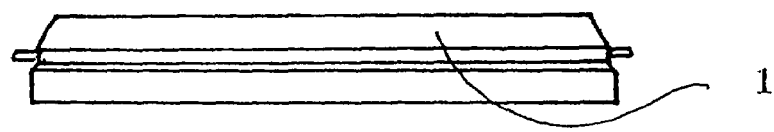
FIG. 12 is a partial perspective view of the present invention.
Figure 13:
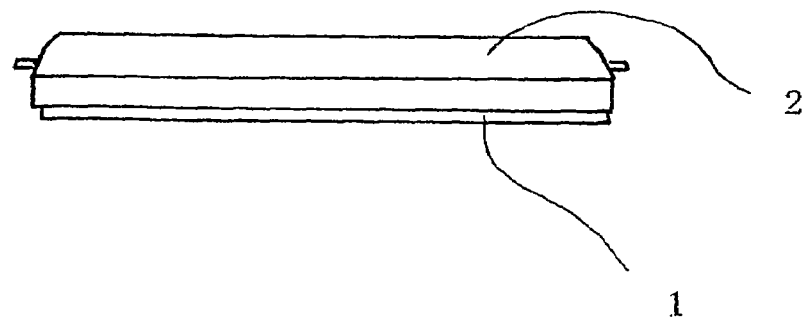
FIG. 13 is a partial perspective view of the present invention.

FIG. 10 shows the rotary shaft 3, and FIGS. 11, 12, and 13 are partial perspective views of the present invention.

Figure 14:
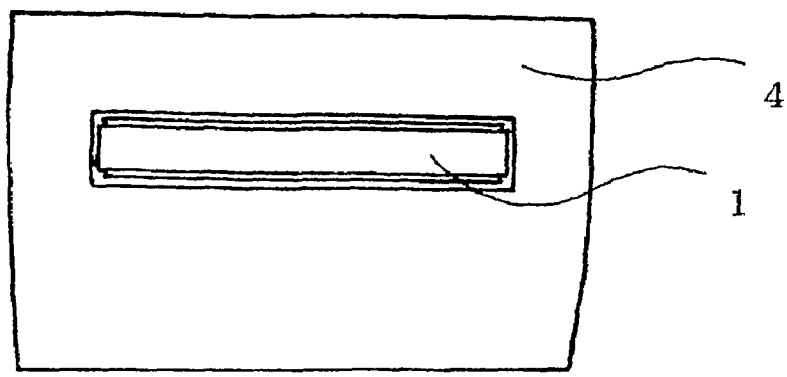
FIGS. 14 and 15 are front views of the present invention.
Figure 15:
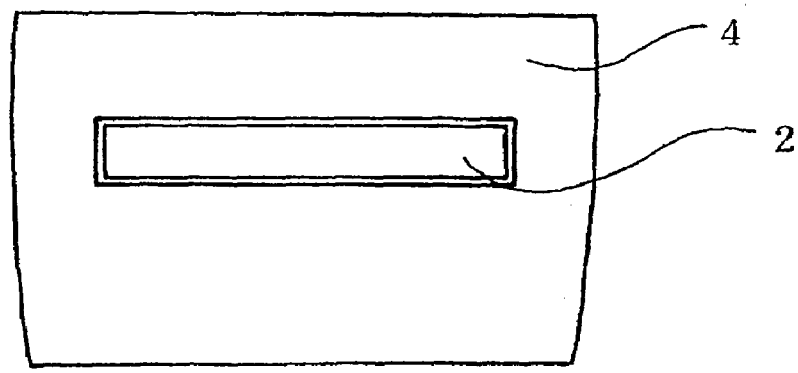

FIG. 14 is a front view showing the state in which the article 1 for protecting the automobile body protects the automobile body, and FIG. 15 is a front view showing the state in which the article for protecting the automobile body is stored in the automobile body.

Figures 16, 17:
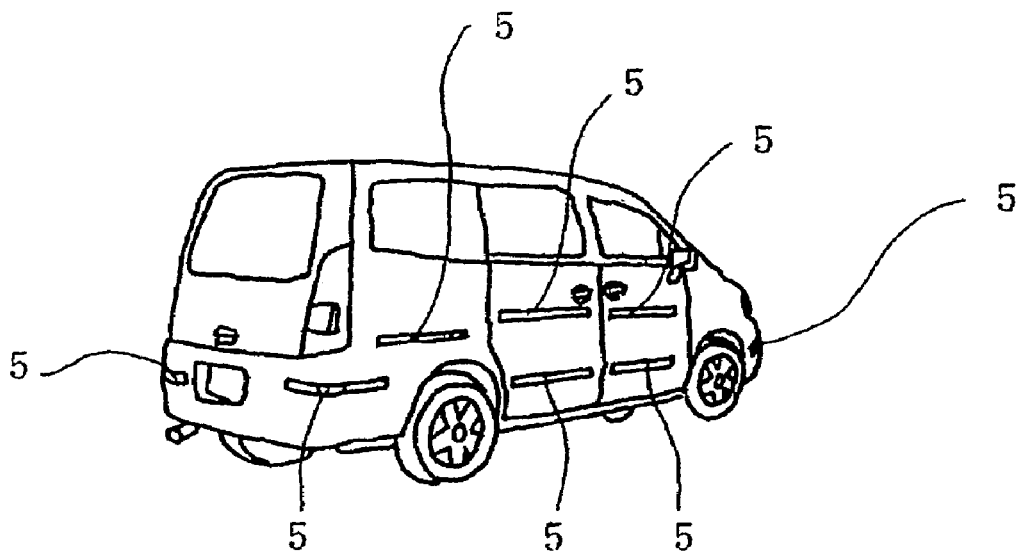
FIG. 16 illustrates an embodiment of the present invention.
FIG. 17 is a process drawing of the present invention.

FIG. 16 shows an embodiment of articles 5 of the present invention at which devices for storing articles 1 for protecting the automobile body in accordance with the present invention are mounted to the sides and corners of the automobile.

An article for protecting the automobile body is stored in the automobile body on the basis of the process drawing shown in FIG. 17. Thereafter, rotating the article 2 having the same material as the automobile body causes the article to be installed in the state in which it protects the automobile body.

Optionally, a device for horizontally moving and storing an article for protecting the automobile body may be added.

Accordingly, when an automobile is parked, the device for storing an article for protecting an automobile body according to the present invention makes it possible for the article for protecting the automobile body to serve as a device for protecting the automobile body by installing the article into the state in which it protects the automobile body. In addition, the storing device makes it possible for the automobile to run safely because there is no longer a protruding portion when the storing device stores the article for protecting the automobile body. Further, it is possible to use a design which could not have been hitherto used.

A production method in accordance with the present invention produces body parts of an automobile except a part to which an article for protecting an automobile body is mounted. Thereafter, the device for storing an article for protecting the automobile body is mounted, so that the assembly of the automobile body is completed.

The present invention is carried out by rotating the device for storing an article for protecting the automobile body by electric power with a switch located inside the vehicle or with a remote controller when an automobile is parked. In addition, it is carried out by storing the article for protecting the automobile body when the automobile is running or in any other state.

The invention claimed is:

1. A device for storing an article for protecting an automobile body, said device comprising:
   a rotatable body comprising a first article and a second article,
   said first article being disposed on said second article, and configured to protect an exterior portion of the automobile body; and
   said second article surrounding an axis of rotation positioned within the automobile body,
   wherein said rotatable body rotates about said axis of rotation,
   wherein said rotatable body has a first position and a second position such that, in said first position, said first article extends from the automobile body to protect the automobile body, and, in said second position, said first article is concealed within the automobile body, and
   wherein the rotating body rotates approximately 180 degrees to change its position from said first position to said second position.

2. The device of claim 1, wherein said second article is formed of the same material as the automobile body.

3. The device of claim 1, further comprising:
   a switch, which is operative to activate electric power to rotate said rotating body between said first position and said second position,
   wherein said switch is located inside the automobile.

4. The device of claim 1, further comprising:
   a switch, which is operative to activate electric power to rotate said rotating body between said first position and said second position,
   wherein said switch is a remote controller.

5. A device for storing an article for protecting an automobile body, said device comprising:
   a rotatable body comprising a first article and a second article,
   said first article being disposed on said second article, and configured to protect an exterior portion of the automobile body; and
   said second article surrounding an axis of rotation positioned within the automobile body,
   wherein said rotatable body rotates about said axis of rotation,
   wherein said rotatable body has a first position and a second position such that, in said first position, said first article extends from the automobile body to protect the automobile body, and, in said second position, said first article is concealed within the automobile body, and
   wherein, with respect to a cross-section taken perpendicular to said axis of rotation, said axis of rotation extends along the center of said second article.

6. The device of claim 5, wherein said second article is formed of the same material as the automobile body.

7. The device of claim 5, further comprising:
   a switch, which is operative to activate electric power to rotate said rotating body between said first position and said second position,
   wherein said switch is located inside the automobile.

8. The device of claim 5, further comprising:
   a switch, which is operative to activate electric power to rotate said rotating body between said first position and said second position,
   wherein said switch is a remote controller.

* * * * *